(12) United States Patent
Sasaki et al.

(10) Patent No.: US 12,528,353 B2
(45) Date of Patent: Jan. 20, 2026

(54) SUPPORT SYSTEM

(71) Applicant: MITSUBISHI JIDOSHA KOGYO KABUSHIKI KAISHA, Tokyo (JP)

(72) Inventors: Yusuke Sasaki, Tokyo (JP); Makoto Kamihira, Tokyo (JP); Yuichi Tomida, Tokyo (JP); Toshifumi Mizui, Tokyo (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 29 days.

(21) Appl. No.: 18/723,929

(22) PCT Filed: Jan. 27, 2023

(86) PCT No.: PCT/JP2023/002612
§ 371 (c)(1),
(2) Date: Jun. 25, 2024

(87) PCT Pub. No.: WO2023/157608
PCT Pub. Date: Aug. 24, 2023

(65) Prior Publication Data
US 2025/0058630 A1     Feb. 20, 2025

(30) Foreign Application Priority Data
Feb. 15, 2022 (JP) .................. 2022-021209

(51) Int. Cl.
*B60K 35/28* (2024.01)
*B60L 58/12* (2019.01)
(Continued)

(52) U.S. Cl.
CPC .............. *B60K 35/28* (2024.01); *B60L 58/12* (2019.02); *B60W 30/182* (2013.01);
(Continued)

(58) Field of Classification Search
CPC ... B60K 35/28; B60K 2360/169; B60L 58/12; B60L 2250/16; B60W 30/182;
(Continued)

(56) References Cited

U.S. PATENT DOCUMENTS 9,764,632 B2 * 9/2017 Yu ........................ B60L 58/12
9,895,993 B2 * 2/2018 Kishida ................ B60W 50/14
(Continued)

FOREIGN PATENT DOCUMENTS

DE   10 2011 112 643 A1   3/2013
DE   10 2016 204 820 A1   9/2016
(Continued)

OTHER PUBLICATIONS

International Preliminary Report on Patentability for International Application No. PCT/JP2023/002612, dated Aug. 15, 2024.
(Continued)

*Primary Examiner* — Chico A Foxx
(74) *Attorney, Agent, or Firm* — BIRCH, STEWART, KOLASCH & BIRCH, LLP

(57) ABSTRACT

A display control device for a support system includes a number-of-charging-lights determination unit for determining the number of charging lights, which corresponds to state-of-charge which ranges from maximum state-of-charge of a driving battery to a charge threshold and is assigned to a plurality of segments; a number-of-output-lights determination unit for determining the number of output lights, which corresponds to a difference, where a requested output ranging from an output that can be output to an output threshold is assigned to the plurality of segments; and a number-of-lights instruction unit for instructing a display device to light up the least number of segments of the number of charging lights or the number of output lights, when an EV priority mode is selected.

6 Claims, 7 Drawing Sheets

(51) Int. Cl.
  *B60W 30/182*      (2020.01)
  *B60W 50/08*       (2020.01)
  *B60W 50/14*       (2020.01)
(52) U.S. Cl.
  CPC .......... *B60W 50/082* (2013.01); *B60W 50/14* (2013.01); *B60K 2360/169* (2024.01); *B60L 2250/16* (2013.01); *B60W 2050/146* (2013.01); *B60W 2510/182* (2013.01)
(58) Field of Classification Search
  CPC ............... B60W 50/082; B60W 50/14; B60W 2050/146; B60W 2510/182
  See application file for complete search history.

(56) References Cited

U.S. PATENT DOCUMENTS

| | | | | |
|---|---|---|---|---|
| 2009/0143929 | A1* | 6/2009 | Eberhard | B60L 3/0046 903/907 |
| 2010/0145560 | A1* | 6/2010 | Komatsu | B60W 10/06 180/65.265 |
| 2013/0009764 | A1 | 1/2013 | Yamamoto et al. | |
| 2014/0158441 | A1 | 6/2014 | Ono et al. | |
| 2016/0243959 | A1* | 8/2016 | Kishida | B60W 50/14 |
| 2016/0259362 | A1 | 9/2016 | Suzaki et al. | |
| 2017/0291598 | A1* | 10/2017 | Murase | B60K 6/442 |
| 2020/0406748 | A1* | 12/2020 | Yui | B60L 58/12 |
| 2022/0227348 | A1* | 7/2022 | Aratake | B60W 20/30 |
| 2022/0227349 | A1* | 7/2022 | Aratake | B60K 6/48 |
| 2022/0227350 | A1* | 7/2022 | Aratake | B60W 10/119 |

FOREIGN PATENT DOCUMENTS

| | | |
|---|---|---|
| EP | 2 070 787 A1 | 6/2009 |
| JP | 7-194013 A | 7/1995 |
| JP | 2006-290182 A | 10/2006 |
| JP | 2013-154717 A | 8/2013 |
| JP | 2014-113830 A | 6/2014 |
| JP | 5516027 B2 | 6/2014 |
| JP | 2017-185965 A | 10/2017 |
| JP | 2019-170136 A | 10/2019 |

OTHER PUBLICATIONS

International Search Report (PCT/ISA/210) issued in PCT/JP2023/002612, dated Apr. 18, 2023.

Extended European Search Report for European Application No. 23756136.0, dated Jul. 21, 2025.

* cited by examiner

SUPPORT SYSTEM

TECHNICAL FIELD

The present disclosure relates to a support system for supporting continued EV driving of a hybrid vehicle.

BACKGROUND

Patent Document 1 discloses a vehicle control device for a vehicle powered by an internal combustion engine and a driving motor for generating a vehicle driving force by receiving power supply from a power storage device. The vehicle control device includes a detection part for detecting a remaining capacity of the power storage device, and a control part for selecting one of driving modes from a first mode for prioritizing motor driving using the driving motor with the internal combustion engine stopped and a second mode for forcibly prioritizing hybrid driving using the internal combustion engine and the driving motor regardless of the driving mode being selected, when the remaining capacity decreases below a first threshold.

Further, the vehicle disclosed in Patent Document 1 is provided with a display device for displaying the remaining capacity. The display device displays which of a plurality of stages the remaining capacity is at, depending on the presence or absence of lighting of each of a plurality of segments corresponding to from a lower limit value to an upper limit value of the remaining capacity and capable of lighting.

CITATION LIST

Patent Literature

Patent Document 1: JP5516027B

SUMMARY

Technical Problem

Meanwhile, if a user's requested output is not less than a predetermined threshold (output threshold), the internal combustion engine starts even if there is a surplus in the remaining capacity of the power storage device, making it impossible to continue motor driving (EV driving).

Therefore, the continued EV driving cannot be supported (an EV driving distance cannot be extended) merely by displaying which of the plurality of stages the remaining capacity is at depending on the presence or absence of lighting of each of the plurality of segments corresponding to from the lower limit value to the upper limit value of the remaining capacity and capable of lighting.

In view of the above, an object of at least one embodiment of the present invention is to provide a support system capable of supporting the continued EV driving.

Solution to Problem (1) A support system according to at least one embodiment of the present invention is a support system for continued EV driving of a hybrid vehicle which is allowed to select an EV priority mode where EV driving in which the hybrid vehicle travels with an engine stopped is prioritized over engine driving in which the hybrid vehicle travels with the engine in operation, and even when the EV priority mode is selected, starts the engine if state-of-charge of a driving battery is not greater than a predetermined charge threshold or a requested output of a user is not less than a predetermined output threshold, including: an EV priority mode selection device for selecting the EV priority mode; a state-of-charge detection device for detecting the state-of-charge; a requested output detection device for detecting the requested output; a display control device; and a display device for displaying a plurality of segments lined up in a row, at an instruction from the display control device, when the EV priority mode is selected. The display control device includes: a number-of-charging-lights determination unit for determining the number of charging lights, which corresponds to the state-of-charge, the state-of-charge ranging from maximum state-of-charge of the driving battery to the charge threshold being assigned to the plurality of segments such that the state-of-charge corresponds to the number of lights of the plurality of segments a number-of-output-lights determination unit for determining the number of output lights, which corresponds to a difference between the requested output and an output that can be output with the engine stopped, the requested output ranging from the output that can be output to the output threshold being assigned to the plurality of segments such that the difference corresponds to the number of lights of the plurality of segments; and a number-of-lights instruction unit for instructing the display device to light up the least number of segments of the number of charging lights or the number of output lights, when the EV priority mode is selected.

With the above configuration (1), since the least number of segments of the number of charging lights or the number of output lights light up when the EV priority mode is selected, the user can continue EV driving by avoiding a sudden accelerator pedal operation while monitoring the number of segment lights (the number of lights turned off) and by prioritizing a regenerative braking operation over a brake pedal operation (support for continued EV driving).

(2) In some embodiments, in the above configuration (1), the support system includes a charge mode selection device for enabling selection of a charge mode where the driving battery is charged with electricity generated by the engine. The number-of-lights instruction unit instructs the display device to light up the segments of the number of charging lights, when the charge mode is selected.

With the above configuration (2), since the segments of the number of charging lights light up when the charge mode is selected, the user can visually recognize the state-of-charge of the driving battery.

(3) In some embodiments, in the above configuration (1) or (2), when the EV priority mode is selected, the display device turns on an EV indicator at an instruction from the display control device if the EV driving is possible, whereas the display device turns off the EV indicator at an instruction from the display control device if the EV driving is impossible.

With the above configuration (3), the user can aware that EV driving is possible, by turning on the EV indicator, and the user can aware that EV driving is impossible (engine driving is performed), by turning off the EV indicator. Further, by turning off the EV indicator, the user can aware that the driving battery is charged with electricity generated by the engine due to return from engine driving to EV driving, and that the driving battery is charged by the regenerative braking. Whereby, in order to return from engine driving to EV driving, the user can be urged to avoid the sudden accelerator pedal operation and prioritize the regenerative braking operation over the brake pedal operation. Further, since the EV indicator transitions from off to on upon the return from engine driving to EV driving, the user can visually recognize a timing of returning from engine driving to EV driving.

(4) In some embodiments, in any one of the above configurations (1) to (3), the plurality of segments include a segment for indicating full charge, which lights up if the state-of-charge of the driving battery is not less than predetermined full state-of-charge.

With the above configuration (4), the user can visually recognize whether the state-of-charge of the driving battery is not less than the full state-of-charge.

(5) In some embodiments, in any one of the above configurations (1) to (5), the support system is a support system for starting the engine if a negative pressure of a brake booster is not greater than a predetermined negative pressure threshold, the support system including: a negative pressure detection device for detecting the negative pressure; and a number-of-negative-pressure-lights determination unit for determining the number of negative pressure lights, which corresponds to the negative pressure, the negative pressure ranging from a maximum negative pressure stored in the brake booster to the negative pressure threshold being assigned to the plurality of segments such that the negative pressure corresponds to the number of lights of the plurality of segments. The number-of-lights instruction unit instructs the display device to light up the least number of segments of the number of charging lights, the number of negative pressure lights, or the number of output lights, when the EV priority mode is selected.

With the above configuration (5), since the least number of segments of the number of charging lights, the number of negative pressure lights, or the number of output lights light up when the EV priority mode is selected, the user can continue EV driving by avoiding the sudden accelerator pedal operation while monitoring the number of segment lights (the number of lights turned off) and by prioritizing the regenerative braking operation over the brake pedal operation.

(6) In some embodiments, in any one of the above configurations (1) to (5), the display device displays an SOC meter for displaying the state-of-charge of the driving battery.

With the above configuration (6), the user can visually recognize the state-of-charge of the driving battery and how much time is left before the engine starts.

Advantageous Effects

According to at least one embodiment of the present invention, it is possible to continue EV driving (support continued EV driving).

DETAILED DESCRIPTION

Figure 1:
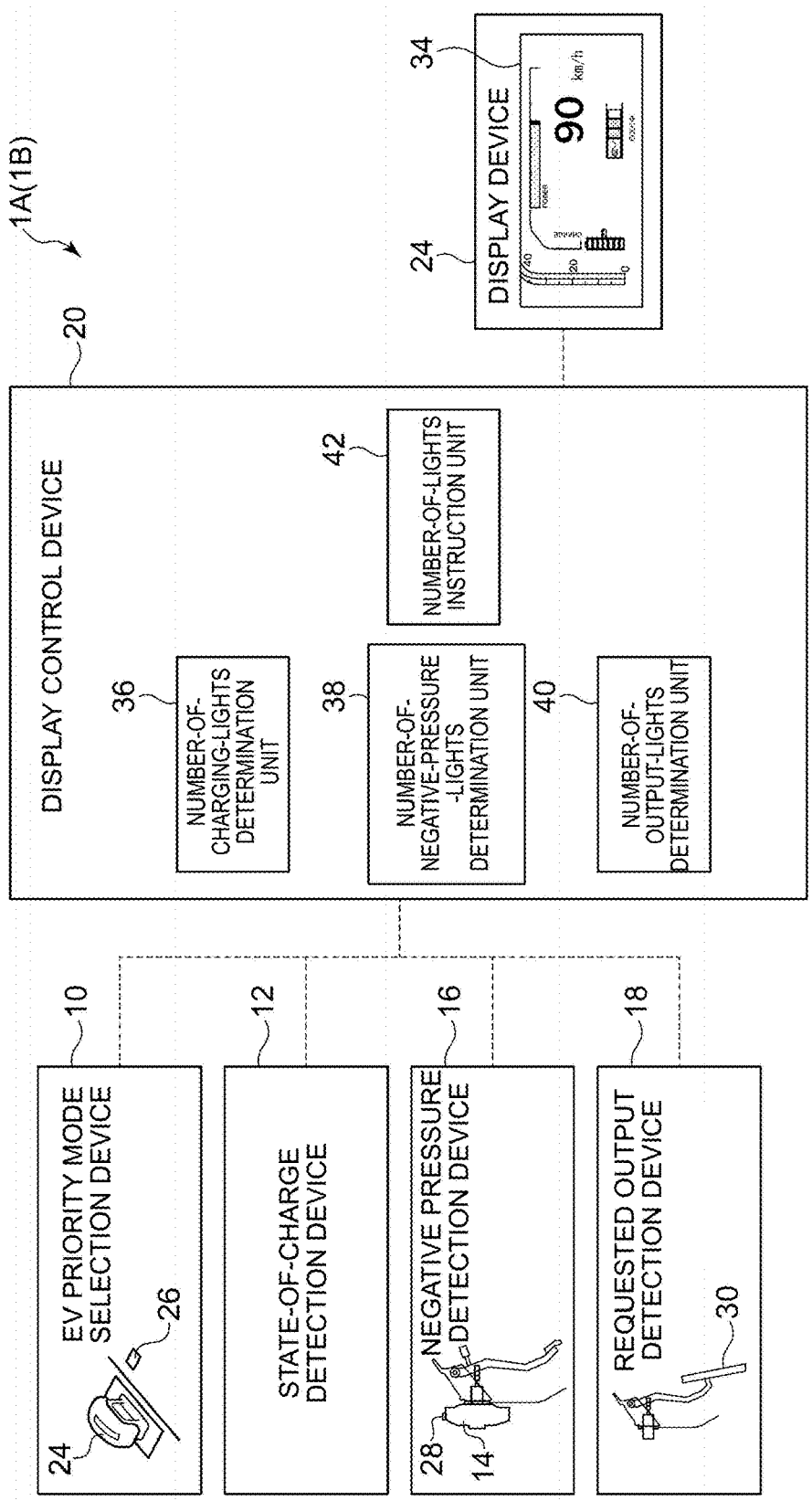
FIG. 1 is a block diagram schematically showing the configuration of a support system according to Embodiments 1 and 2.

Some embodiments of the present invention will be described below with reference to the accompanying drawings. It is intended, however, that unless particularly identified, dimensions, materials, shapes, relative positions and the like of components described or shown in the drawings as the embodiments shall be interpreted as illustrative only and not intended to limit the scope of the present invention.

Embodiment 1

[Overview of Hybrid Vehicle]

A vehicle equipped with a support system according to Embodiment 1 is a hybrid vehicle powered by an engine and a motor, and is capable of engine driving in which the vehicle travels with the engine in operation and EV driving in which the vehicle travels with the engine stopped. The hybrid vehicle is, for example, a plug-in hybrid vehicle (PHEV, PHV) that can be charged from an external power source by external charging or that can supply external power to an external device, but is not limited to the plug-in hybrid vehicle.

Further, the hybrid vehicle according to Embodiment 1 is allowed to select an EV priority mode where EV driving is prioritized over engine driving, and even when the EV priority mode is selected, is configured to start the engine if state-of-charge (SOC) of a driving battery is not greater than a predetermined charge threshold, a negative pressure of a brake booster is not greater than a predetermined negative pressure threshold, or a user's requested output is not less than a predetermined output threshold.

Further, when the engine starts, the hybrid vehicle according to Embodiment 1 is configured to stop the engine if the state-of-charge of the driving battery is not less than a predetermined engine stop charge threshold, the negative pressure of the brake booster is not less than a predetermined engine stop negative pressure threshold, or the user's requested output is not greater than the output threshold. The engine stop charge threshold is optionally set within a range not greater than maximum state-of-charge of the driving battery and not less than the charge threshold, and the engine stop negative pressure threshold is optionally set within a range not less than a maximum negative pressure stored in the brake booster and not greater than the negative pressure threshold.

[Configuration of Support System]

A support system 1A according to Embodiment 1 is a system for supporting continued EV driving and includes, as shown in FIG. 1, an EV priority mode selection device 10 for selecting the EV priority mode, a state-of-charge detection device 12 for detecting the state-of-charge of the driving battery, a negative pressure detection device 16 for detecting a negative pressure of a brake booster 14, a requested output detection device 18 for detecting the user's requested output, a display control device 20, and a display device 22 for displaying a plurality of segments SG1 to SG3, which are lined up in a row, at an instruction from the display control device 20 when the EV priority mode is selected.

Figure 2:
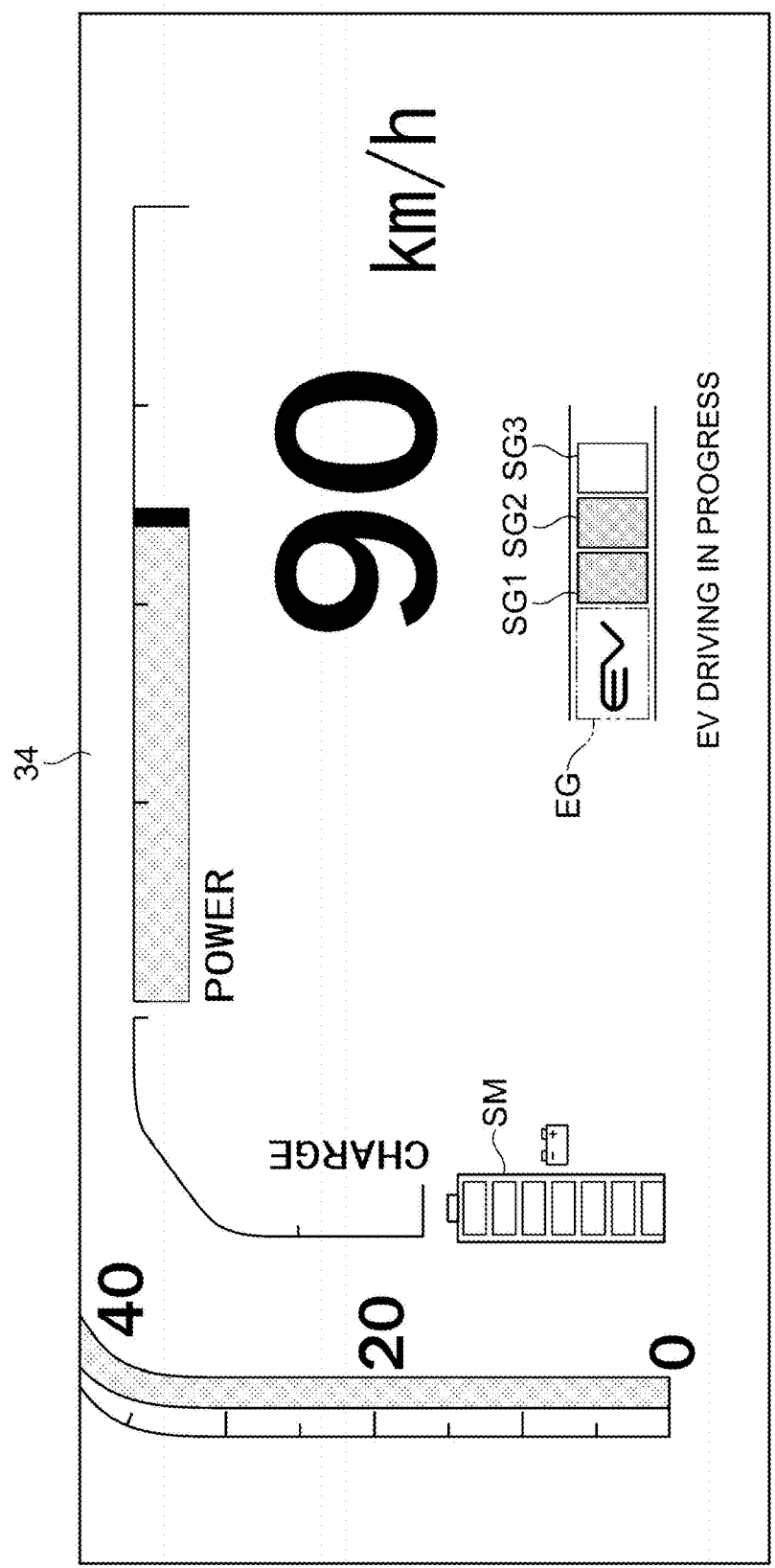
FIG. 2 is a view showing an example of an image displayed on a display device shown in FIG. 1.

The EV priority mode selection device 10 is configured by, for example, an EV mode selector switch 26 disposed at a position adjacent to a selector lever 24, and the EV priority mode is selected by selecting the EV priority mode. The state-of-charge detection device 12 is configured by, for example, a battery management system (not shown) disposed in the driving battery. The negative pressure detection device 16 is configured by, for example, a pressure sensor 28 disposed in the brake booster 14. The requested output detection device 18 is configured by, for example, an accelerator pedal position sensor 32 for detecting an amount of depression of an accelerator pedal 30. The display device 22 is configured by, for example, a multi-information display 34 disposed within a meter. The display control device 20 is configured by, for example, a processor (not shown) composed of a computing device, a register for storing an instruction or information, a peripheral circuit, and the like, a memory (not shown) such as ROM (Read Only Memory), RAM (Random Access Memory), and an input/output interface (not shown). As shown in FIG. 2, the display device 22 displays, for example, an SOC meter SM for displaying the state-of-charge of the driving battery and displays, when the EV priority mode is selected, the plurality of segments SG1 to SG3, which are lined up in a row, side by side with the SOC meter SM. However, the display of the SOC meter SM is not essential but optional. Further, the plurality of segments SG1 to SG3 lined up in a row are configured by, for example, three segments SG1 to SG3 lined up on the left and right, but the number of plurality of segments SG1 to SG3 is not limited to three.

[Detailed Configuration of Display Control Device 20]

As shown in FIG. 1, the display control device 20 includes a number-of-charging-lights determination unit 36, a number-of-negative-pressure-lights determination unit 38, a number-of-output-lights determination unit 40, and a number-of-lights instruction unit 42.

The plurality of segments SG1 to SG3 are assigned the state-of-charge ranging from the maximum state-of-charge of the driving battery to the charge threshold at which the engine starts, and the number-of-charging-lights determination unit 36 determines the number of lights, which corresponds to the state-of-charge of the driving battery (hereinafter "referred to as the number of charging lights").

Further, the plurality of segments SG1 to SG3 are assigned the negative pressure ranging from the maximum negative pressure stored in the brake booster 14 to the negative pressure threshold at which the engine starts, and the number-of-negative-pressure-lights determination unit 38 determines the number of lights, which corresponds to the negative pressure of the brake booster 14 (hereinafter referred to as "the number of negative pressure lights").

Further, the plurality of segments SG1 to SG3 are assigned the requested output ranging from an output that can be output with the engine stopped to the output threshold at which the engine starts, and the number-of-output-lights determination unit 40 determines the number of lights, which corresponds to a difference between the output that can be output with the engine stopped and the requested output (hereinafter referred to as "the number of output lights").

When the EV priority mode is selected by the EV priority mode selection device 10, the number-of-lights instruction unit 42 instructs the display device 22 to light up the least number of segments SG1 to SG3 of the number of charging lights determined by the number-of-charging-lights determination unit 36, the number of negative pressure lights determined by the number-of-negative-pressure-lights determination unit 38, or the number of output lights determined by the number-of-output-lights determination unit 40.

[Operation of Support System 1A]

Figure 3:
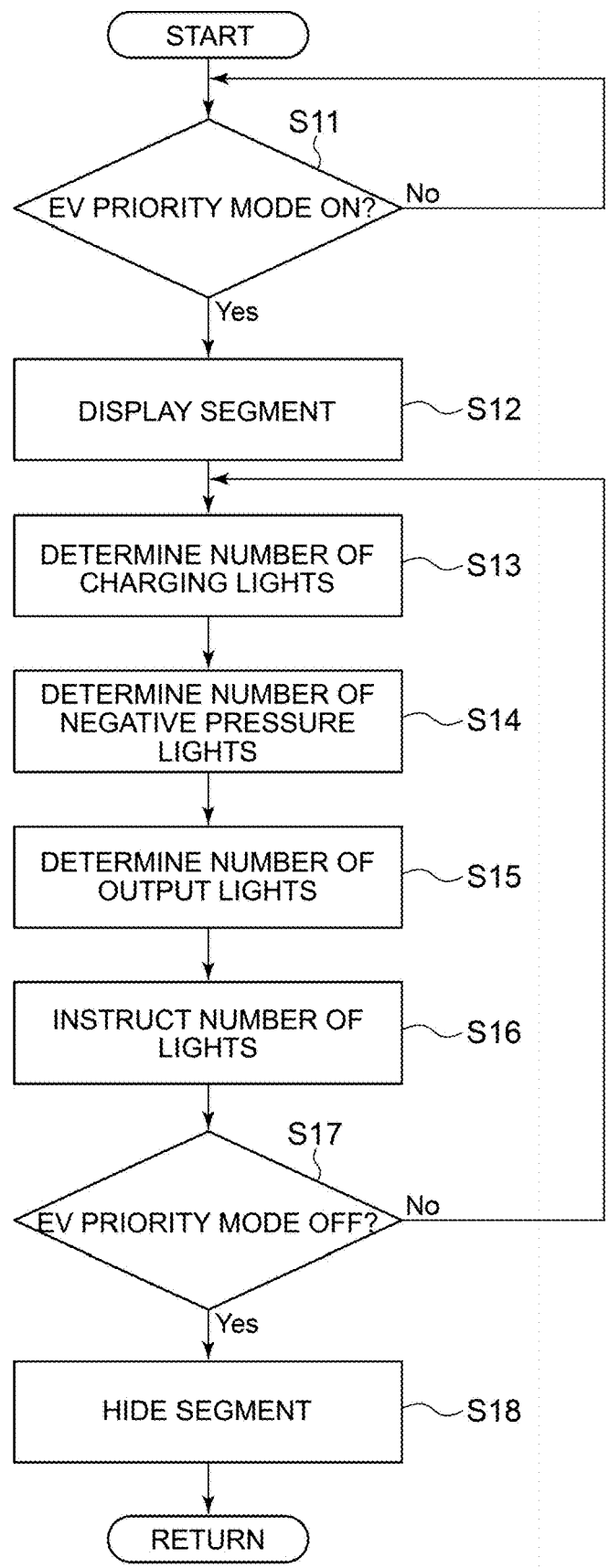
FIG. 3 is a flowchart schematically showing an operation of the support system according to Embodiment 1.

As shown in FIG. 3, in the support system 1A according to Embodiment 1, when the EV priority mode is selected (EV priority mode is turned ON) by the EV priority mode selection device 10 (step S11: Yes), the plurality of segments SG1 to SG3 lined up in a row are displayed on the display device 22 at the instruction from the display control device 20 (step S12).

Next, the number-of-charging-lights determination unit 36 determines the number of charging lights, which corresponds to the state-of-charge of the driving battery, based on the state-of-charge of the driving battery detected by a state-of-charge detection unit step S13). Next, the number-of-negative-pressure-lights determination unit 38 determines the number of negative pressure lights, which corresponds to the negative pressure of the brake booster 14, based on the negative pressure of the brake booster 14 detected by the negative pressure detection device 16 (step S14). Next, based on the user's requested output detected by the requested output detection device 18, the number-of-output-lights determination unit 40 calculates the difference between the output that can be output with the engine stopped and the user's requested output, and determines the number of output lights, which corresponds to this difference (step S15).

Next, the number-of-lights instruction unit 42 instructs the display device 22 to light up the least number of segments SG1 to SG3 of the number of charging lights determined by the number-of-charging-lights determination unit 36, the number of negative pressure lights determined by the number-of-negative-pressure-lights determination unit 38, or the number of output lights determined by the number-of-output-lights determination unit (step S16). Whereby, the display device 22 lights up the number of segments SG1 to SG3 instructed by the number-of-lights instruction unit 42 (display control device 20). Hereinafter, steps S13 to S17 are repeated until the EV priority mode is canceled (EV priority mode is turned OFF) by the EV priority mode selection device 10.

On the other hand, when the EV priority mode is canceled (EV priority mode is turned OFF) by the EV priority mode selection device 10 (step S17: Yes), the plurality of segments SG1 to SG4 displayed on the display device 22 are hidden until the EV priority mode is selected again, at an instruction from the display control device 20 (step S18).

In the support system 1A according to Embodiment 1, when the EV priority mode is selected and if EV driving is possible, the driving battery may be charged by a regenerative braking operation, but during EV driving, the number-of-charging-lights determination unit 36 may restrict an increase in the number of charging lights. Further, when the EV priority mode is selected and if EV driving is impossible (engine driving is performed), an accelerator pedal operation may consume electricity charged in the driving battery, but during engine driving, the number-of-charging-lights determination unit 36 may restrict a decrease in the number of charging lights. Likewise, a brake pedal operation may consume the negative pressure of the brake booster 14, but during EV driving, the number-of-negative-pressure-lights determination unit 38 may restrict a decrease in the number of negative pressure lights.

[Effect of Support System 1A]

With the support system 1A according to Embodiment 1, since the least number of segments SG1 to SG3 of the number of charging lights, the number of negative pressure lights, or the number of output lights light up when the EV priority mode is selected, a user can continue EV driving by avoiding a sudden accelerator pedal operation while monitoring the number of segment lights (the number of lights turned off) and by prioritizing the regenerative braking operation over the brake pedal operation (support for continued EV driving).

Embodiment 2

[Configuration of Support System]

In a support system 1B (see FIG. 1) according to Embodiment 2, when the EV priority mode is selected, the display device 22 turns on an EV indicator EG at an instruction from the display control device 20 if EV driving is possible, whereas the display device 22 turns off the EV indicator EG at an instruction from the display control device 20 if EV driving is impossible. As shown in FIG. 2, the EV indicator EG is, for example, bordered letters "EV", and is configured such that the letters EV are filled in and illuminated when the EV indicator EG is turned on. Further, in the support system 1B according to Embodiment 2, when the EV priority mode mode is selected, the display device 22 may display text "EV driving in progress" at an instruction from the display control device 20 if EV driving is possible, whereas the display device 22 may display text "Standby" at an instruction from the display control device 20 if EV driving is impossible. Further, in the support system 1B according to Embodiment 2, when the EV priority mode mode is selected, the display device 22 may set a lighting color of the plurality of segments SG1 to SG3 lined up in a row to one lighting color (for example, green) at an instruction from the display control device 20 if EV driving is possible, whereas the display device 22 may set the lighting color of the plurality of segments SG1 to SG3 lined up in a row to another lighting color (for example, orange) at an instruction from the display control device 20 if EV driving is impossible. Other configurations are the same as those of the support system 1A according to Embodiment 1.

[Operation of Support System 1B]

Figure 4:
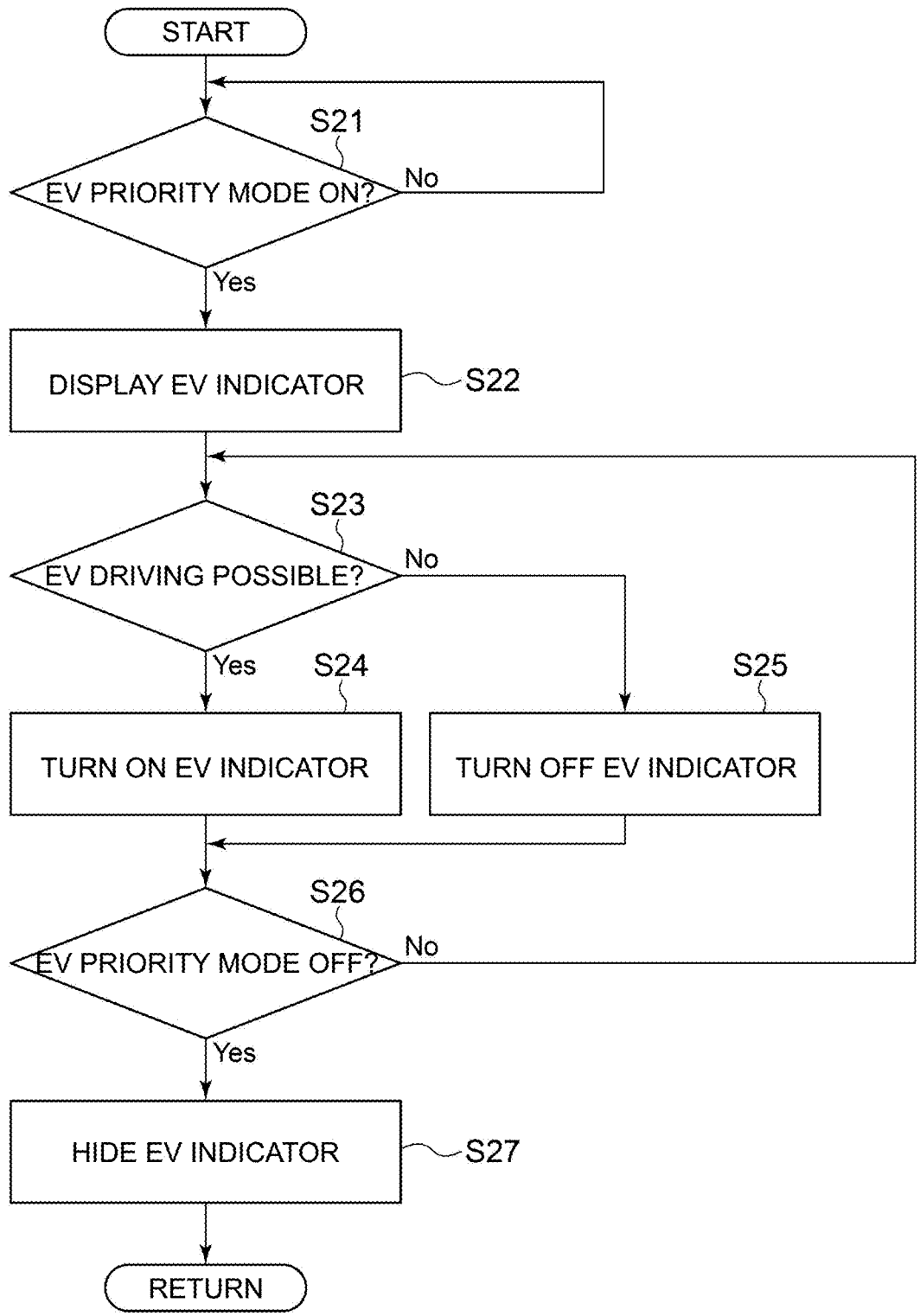
FIG. 4 is a flowchart schematically showing an operation of the support system according to Embodiment 2.

As shown in FIG. 4, in the support system 1B according to Embodiment 2, when the EV priority mode is selected (EV priority mode is turned ON) by the EV priority mode selection device 10 (step S21: Yes), the EV indicator EG is displayed on the display device 22 at the instruction from the display control device 20 (step S22).

Next, it is determined whether EV driving is possible (step S23). Then, if EV driving is possible (step S23: Yes), that is, the state-of-charge of the driving battery exceeds the charge threshold, the negative pressure of the brake booster 14 exceeds the negative pressure threshold, and the user's requested output is less than the output threshold, the EV indicator EG is turned on (step S24). On the other hand, if EV driving is impossible (step S23: No), that is, the state-of-charge of the driving battery is not greater than the charge threshold, the negative pressure of the brake booster 14 is not greater than the negative pressure threshold, or the user's requested output is not less than the output threshold, the EV indicator EG is turned off (step S25). Hereinafter, steps S23 to S26 are repeated until the EV priority mode is canceled (EV priority mode is turned OFF) by the EV priority mode selection device 10.

On the other hand, when the EV priority mode is canceled (EV priority mode is turned OFF) by the EV priority mode selection device 10 (step S26: Yes), the EV indicator EG displayed on the display device 22 is hidden until the EV priority mode is selected again, at an instruction from the display control device 20 (step S27). Other operations are the same as those of the support system 1A according to Embodiment 1.

[Effect of Support System 1B]

With the support system 1B according to Embodiment 2, the user can aware that EV driving is possible, by turning on the EV indicator EG, and the user can aware that EV driving is impossible (engine driving is performed), by turning off the EV indicator EG. Further, by turning off the EV indicator EG, the user can aware that the driving battery is charged with electricity generated by the engine due to return from engine driving to EV driving, and that the driving battery is charged by the regenerative braking. Whereby, in order to return from engine driving to EV driving, the user can be urged to avoid the sudden accelerator pedal operation and prioritize the regenerative braking operation over the brake pedal operation. Further, since the EV indicator EG transitions from off to on upon the return from engine driving to EV driving, the user can visually recognize a timing of returning from engine driving to EV driving.

Embodiment 3

[Configuration of Support System]

Figure 5:
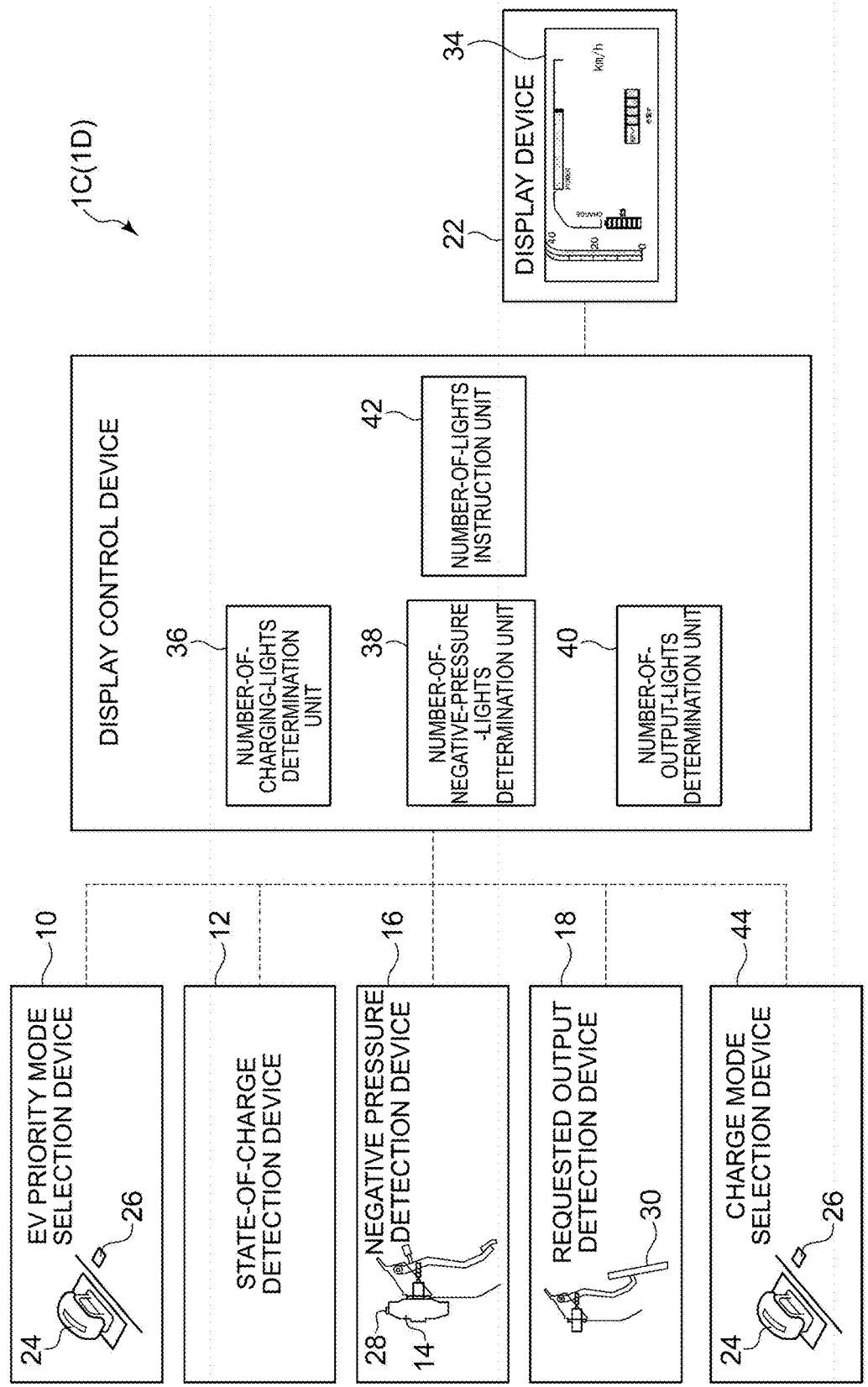
FIG. 5 is a block diagram schematically showing the configuration of a support system according to Embodiments 3 and 4.

As shown in FIG. 5, a support system 1C according to Embodiment 3 includes a charge mode selection device 44 for enabling selection of a charge mode where the driving battery is charged with the electricity generated by the engine. The charge mode selection device 44 is configured by, for example, the EV mode selector switch 26 disposed at the position adjacent to the selector lever 24. Further, in the support system 1C according to Embodiment 3, when the charge mode is selected by the charge mode selection device 44, the number-of-lights instruction unit 42 instructs the display device 22 to light up the segments SG1 to SG3 of the number of charging lights determined by the number-of-charging-lights determination unit 36. Other configurations are the same as those of the support system 1A or 1B according to Embodiment 1 or 2.

[Operation of Support System 1C]

Figure 6:
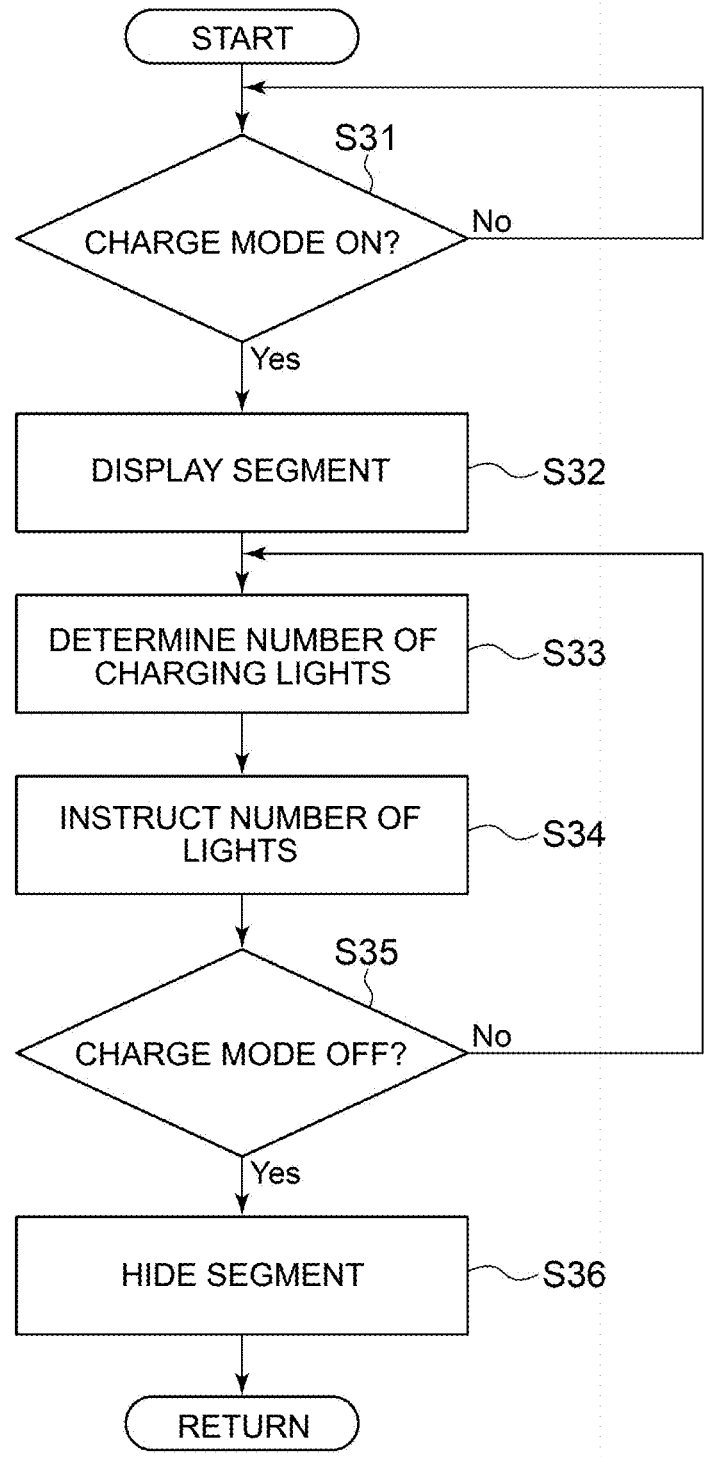
FIG. 6 is a flowchart schematically showing an operation of the support system according to Embodiment 3.

As shown in FIG. 6, in the support system 1C according to Embodiment 3, when the charge mode is selected (charge mode is turned ON) by the charge mode selection device 44 (step A31: Yes), the plurality of segments SG1 to SG3 lined up in a row are displayed on the display device 22 at the instruction from the display control device 20 (step S32: Yes).

Next, the number-of-charging-lights determination unit 36 determines the number of charging lights, which corresponds to the state-of-charge of the driving battery, based on the state-of-charge of the driving battery detected by the state-of-charge detection unit (step S33). Next, the number-of-lights instruction unit 42 instructs the display device 22 to turn on the number of charging lights determined by the number-of-charging-lights determination unit 36 (step S34). Whereby, the display device 22 lights up the number of segments SG1 to SG3 instructed by the number-of-lights instruction unit 42 (display control device 20). Hereinafter, steps S33 to S35 are repeated until the charge mode is canceled (charge mode is turned OFF) by the charge mode selection device 44 step S35: Yes).

On the other hand, when the charge mode is canceled (charge mode is turned OFF) by the charge mode selection device 44, the plurality of segments SG1 to SG3 displayed on the display device 22 are hidden until the charge mode is selected again, at an instruction from the display control device 20. Other operations are the same as those of the support system 1A or 1B according to Embodiment 1 or 2.

[Effect of Support System 1C]

With the support system 1C according to Embodiment 3, since the segments SG1 to SG3 of the number of charging lights light up when the charge mode is selected, the user can visually recognize the state-of-charge of the driving battery.

Embodiment 4

[Configuration of Support System]

Figure 7:
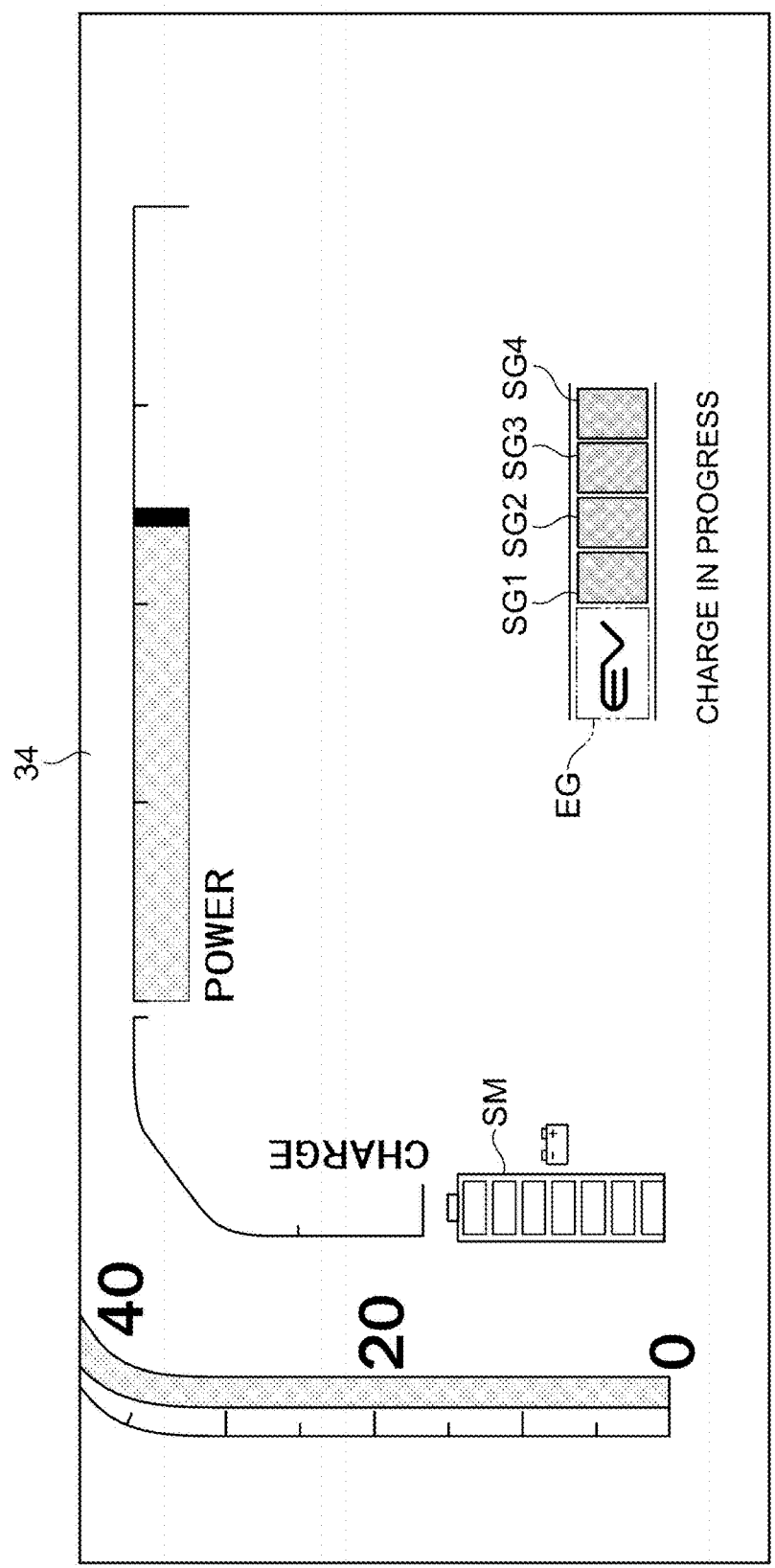
FIG. 7 is a view showing an example of an image displayed on the display device shown in FIG. 5.

As shown in FIG. 7, in a support system 1D (see FIG. 5) according to Embodiment 4, the plurality of segments SG1 to SG4 are configured by four segments SG1 to SG4 lined up in a row on the left and right, and include the segment SG4 for indicating full charge, which lights up if the state-of-charge of the driving battery is not less than predetermined full state-of-charge. The full state-of-charge is the state-of-charge at which the battery is considered fully charged, and if the state-of-charge is not greater than the maximum state-of-charge and the state-of-charge is assigned to three segments SG1 to SG3 from the left side among the four segments SG1 to SG4 lined up on the left and right, the state-of-charge is set which is at least not less than the minimum state-of-charge assigned to the third segment SG3. The segment SG4 for indicating full charge is the first segment SG4 from the right side when the four segments SG1 to SG4 are lined up in a row on the left and right. Other configurations are the same as those of any of the support systems 1A, 1B, 1C according to Embodiments 1 to 3.

[Operation of Support System 1D]

In the support system 1D according to Embodiment 4, for example, when the charge mode is selected by the charge mode selection device 44 and the state-of-charge of the driving battery, which is detected by the state-of-charge detection device 12, becomes not less than full charge due to the operation of the engine, the segment SG4 for indicating full charge lights up at an instruction from the display control device 20.

Further, for example, when a hybrid vehicle is a plug-in hybrid vehicle, if external charging charges the driving battery from the external power source and the state-of-charge of the driving battery detected by the state-of-charge detection device 12 becomes not less than full charge, the segment SG4 for indicating full charge lights up at the instruction from the display control device 20. Other operations are the same as those of any of the support systems 1A, 1B, 1C according to Embodiments 1 to 3.

[Effect of Support System 1D]

With the support system 1D according to Embodiment 4, the user can visually recognize whether the state-of-charge of the driving battery is not less than the full state-of-charge.

REFERENCE SIGNS LIST 1A, 1B, 1C, 1D Support system
10 EV priority mode selection device
12 State-of-charge detection device
14 Brake booster
16 Negative pressure detection device
18 Requested output detection device
20 Display control device
22 Display device
24 Selector lever
26 EV mode selector switch
28 Pressure sensor
30 Accelerator pedal
32 Accelerator pedal position sensor
34 Multi-information display
36 Number-of-charging-lights determination unit
38 Number-of-negative-pressure-lights determination unit
40 Number-of-output-lights decision unit
42 Number-of-lights instruction unit
44 Charge mode selection device
SG1 to SG3, SG4 Segment
SM SOC meter
EG EV indicator

The invention claimed is:

1. A support system for supporting continued EV driving of a hybrid vehicle which is allowed to select an EV priority mode where EV driving in which the hybrid vehicle travels with an engine stopped is prioritized over engine driving in which the hybrid vehicle travels with the engine in operation, and even when the EV priority mode is selected, starts the engine if state-of-charge of a driving battery is not greater than a predetermined charge threshold or a requested output of a user is not less than a predetermined output threshold, comprising:

an EV priority mode selection device for selecting the EV priority mode;
a state-of-charge detection device for detecting the state-of-charge;
a requested output detection device for detecting the requested output;
a display control device; and
a display device for displaying a plurality of segments lined up in a row, at an instruction from the display control device, when the EV priority mode is selected,
wherein the display control device includes:
a number-of-charging-lights determination unit for restricting an increase in the number of charging lights, which corresponds to the state-of-charge during the EV driving, as well as for determining the number of charging lights, the state-of-charge ranging from maximum state-of-charge of the driving battery to the charge threshold being assigned to the plurality of segments such that the state-of-charge corresponds to the number of lights of the plurality of segments;
a number-of-output-lights determination unit for determining the number of output lights, which corresponds to a difference between the requested output and an output that can be output with the engine stopped, the requested output ranging from the output that can be output to the output threshold being assigned to the plurality of segments such that the difference corresponds to the number of lights of the plurality of segments; and
a number-of-lights instruction unit for instructing the display device to light up the least number of segments of the number of charging lights or the number of output lights, when the EV priority mode is selected.

2. The support system according to claim 1,
wherein the support system is a support system for starting the engine if a negative pressure of a brake booster is not greater than a predetermined negative pressure threshold, the support system comprising:
a negative pressure detection device for detecting the negative pressure; and
a number-of-negative-pressure-lights determination unit for restricting a decrease in the number of negative pressure lights, which corresponds to the negative pressure during the engine driving, as well as for determining the number of negative pressure lights, the negative pressure ranging from a maximum negative pressure stored in the brake booster to the negative pressure threshold being assigned to the plurality of segments such that the negative pressure corresponds to the number of lights of the plurality of segments, and wherein the number-of-lights instruction unit instructs the display device to light up the least number of segments of the number of charging lights, the number of negative pressure lights, or the number of output lights, when the EV priority mode is selected.

3. The support system according to claim 1,
wherein the display device displays an SOC meter for displaying the state-of-charge of the driving battery.

4. The support system according to claim 1,
wherein, when the EV priority mode is selected, the display device turns on an EV indicator at an instruction from the display control device if the EV driving is possible, whereas the display device turns off the EV indicator at an instruction from the display control device if the EV driving is impossible.

5. A support system for supporting continued EV driving of a hybrid vehicle which is allowed to select an EV priority mode where EV driving in which the hybrid vehicle travels with an engine stopped is prioritized over engine driving in which the hybrid vehicle travels with the engine in operation, and even when the EV priority mode is selected, starts the engine if state-of-charge of a driving battery is not greater than a predetermined charge threshold or a requested output of a user is not less than a predetermined output threshold, comprising:

an EV priority mode selection device for selecting the EV priority mode;

a state-of-charge detection device for detecting the state-of-charge;

a requested output detection device for detecting the requested output;

a display control device;

a display device for displaying a plurality of segments lined up in a row, at an instruction from the display control device, when the EV priority mode is selected; and a charge mode selection device for enabling selection of a charge mode where the driving battery is charged with electricity generated by the engine, wherein the display control device includes:

a number-of-charging-lights determination unit for determining the number of charging lights, which corresponds to the state-of-charge, the state-of-charge ranging from maximum state-of-charge of the driving battery to the charge threshold being assigned to the plurality of segments such that the state-of-charge corresponds to the number of lights of the plurality of segments;

a number-of-output-lights determination unit for determining the number of output lights, which corresponds to a difference between the requested output and an output that can be output with the engine stopped, the requested output ranging from the output that can be output to the output threshold being assigned to the plurality of segments such that the difference corresponds to the number of lights of the plurality of segments; and a number-of-lights instruction unit for instructing the display device to light up the least number of segments of the number of charging lights or the number of output lights, when the EV priority mode is selected, wherein the plurality of segments include a segment for indicating full charge, which lights up if the state-of-charge of the driving battery is not less than predetermined full state-of-charge, wherein the number-of-lights instruction unit instructs the display device to light up the segments of the number of charging lights, when the charge mode is selected, and wherein the segment for indicating full charge lights up if the driving battery is charged to not less than the full state-of-charge by an operation of the engine, when the charge mode is selected.

6. A support system for supporting continued EV driving of a hybrid vehicle which is allowed to select an EV priority mode where EV driving in which the hybrid vehicle travels with an engine stopped is prioritized over engine driving in which the hybrid vehicle travels with the engine in operation, and even when the EV priority mode is selected, starts the engine if state-of-charge of a driving battery is not greater than a predetermined charge threshold or a requested output of a user is not less than a predetermined output threshold, comprising:

an EV priority mode selection device for selecting the EV priority mode;

a state-of-charge detection device for detecting the state-of-charge;

a requested output detection device for detecting the requested output;

a display control device;

a display device for displaying a plurality of segments lined up in a row, at an instruction from the display control device, when the EV priority mode is selected; and wherein the plurality of segments include a segment for indicating full charge, which lights up if the state-of-charge of the driving battery is not less than predetermined full state-of-charge, and wherein the segment for indicating full charge lights up if the driving battery is charged to not less than the full state-of-charge by an external power source.

* * * * *